United States Patent
Brown et al.

(10) Patent No.: US 7,087,849 B2
(45) Date of Patent: Aug. 8, 2006

(54) SWITCH DEVICE AND METHOD FOR CONTROLLING A SPRAYER

(75) Inventors: James Dennis Brown, Fayetteville, GA (US); Allen Tison, Warwick, GA (US)

(73) Assignee: One Pass Farm Equipment, LLC, Fayetteville, GA (US)

( * ) Notice: Subject to any disclaimer, the term of this patent is extended or adjusted under 35 U.S.C. 154(b) by 280 days.

(21) Appl. No.: 10/828,061

(22) Filed: Apr. 20, 2004

(65) Prior Publication Data

US 2005/0230232 A1    Oct. 20, 2005

(51) Int. Cl.
*H01H 3/16*    (2006.01)

(52) U.S. Cl. .............................. 200/61.39; 200/61.41; 200/573

(58) Field of Classification Search .. 200/61.13–61.18, 200/61.39, 61.41, 47, 61.43, 573, 574, 61.46, 200/61.42; 251/129.01, 129.03, 129.11, 251/129.12, 129.13

See application file for complete search history.

(56) References Cited

U.S. PATENT DOCUMENTS

| | | | | |
|---|---|---|---|---|
| 3,549,833 A | * | 12/1970 | Horton | 200/47 |
| 3,626,119 A | * | 12/1971 | Fry | 200/47 |
| 3,992,597 A | * | 11/1976 | Hannula | 200/61.39 |
| 4,320,317 A | | 3/1982 | Bowey | |
| 4,406,934 A | * | 9/1983 | Elszasz | 200/61.39 |
| 4,934,598 A | | 6/1990 | Schnetzer et al. | |
| 6,935,205 B1 | * | 8/2005 | Danek | 200/573 |

* cited by examiner

*Primary Examiner*—Michael A. Friedhofer
(74) *Attorney, Agent, or Firm*—Brian D. Bellamy

(57) ABSTRACT

A control device processes or agricultural sprayer. A slip member biased by a retaining member and springs to an initial neutral position produces a signal by a sensor upon initiation or cessation of angular forces from rotation of a machine driven shaft. The signal is caused by movement of the slip member from friction produced by an impeller situated within the grease filled slip member. The impeller is coupled directly or indirectly to the machine driven shaft and rotates upon rotation of the shaft. Upon initiation of angular forces on the impeller, the signal produced may cause a valve on an agricultural sprayer to open and initiate spraying therefrom. Upon cessation of angular forces on the impeller, the valve may be closed to turn off the spraying.

12 Claims, 4 Drawing Sheets

SWITCH DEVICE AND METHOD FOR CONTROLLING A SPRAYER

BACKGROUND OF THE INVENTION

1. Field of the Invention

The present invention relates to control devices for switching equipment from an operating state to a non-operating condition. In particular, the invention relates to a control device for controlling agricultural sprayers.

2. Description of the Prior Art

Need for the present control device arises from recognition of conservation problems associated with ground operated agricultural sprayers. These agricultural sprayers are used for depositing onto crops chemicals that increase yields and control crop destroying pests. Many efforts are being made to decrease chemical waste. These efforts include development of precision spray systems that can greatly decrease the quantity of spray materials used on crops without compromising effectiveness, and can reduce the potential pollution arising from off-target deposition. Sensor-controlled precision spray systems are designed to tailor chemical delivery. Two basic types of systems available for certain types of crops use ultrasonic devices or lasers. Many precision systems include onboard computers that can be used to program basic sprayer functions and monitor savings from use of the sensor-controlled systems. Monetary savings are recognized from conservation of spray by turning off nozzles in gaps or when crops do not meet height specifications or the like.

Many efforts are also being made to reduce off-target spray deposition. Besides decreasing production costs, reducing off-target spray application offers the potential of substantially reducing pollution of surface water with spray materials. Off-target spraying may result from application error by not shutting off the boom at the end of a field or when the rig stops. Failure to turn off the boom spraying chemical may result in overspraying a target area or spraying a non-target area. Such fail often causes wasted chemicals, off-target damage, on target damage from over application, higher costs and negative environmental impact to water and air quality.

Further, over spraying may result in increased spray drift, which can cause injury to humans, nearby crops, livestock, and wildlife and costs money not only for waste but for restitution for damaged crops. About ¼ of insurance payouts for misapplication of chemicals is caused by equipment effectiveness and another ⅓ is caused by drift. Thus, a need exists for continued improvement of spray equipment to help applicators keep the application on target.

Commercial agricultural sprayers include an inline valve that controls the release of chemical through a boom having several spray nozzles. Often, the operator manually controls the valve and is responsible for starting and stopping the sprayer. For instance, the operator starts the sprayer when beginning a new row and shuts off the sprayer when traveling to the end of a row or shutting down. Unfortunately, operators make errors or become complacent and forget to start the sprayer or neglect shutting the sprayer off at the desired time. These operator errors cause undesirable over-spray or under-spray. Eliminating such under-spray or over-spray situations by eliminating these operator errors will profit the industry and the environment.

Sprayers generally are supported by ground wheels and travel thereby. The ground wheels rotate in a normal fashion about a rotary shaft. When the sprayer is not moving or changing direction, the ground wheels stop or slow, and it is advantageous for disposition of spray from the sprayer's booms to cease. Further, the sprayer is generally raised from the ground at the end of a row of crop or between use. The ground wheels of the sprayer are disengaged when the sprayer is raised and the ground wheels are not in contact with the ground. It would be desirable to provide a method of automating the shut-off of the sprayer in accordance with the travel of the sprayer or the raising of the sprayer.

Various computerized control systems for sprayers are known for monitoring sprayer performance. For instance, the Deere & Company produces the SPRAYSTAR™ vehicle and rate control system that constantly monitors sprayer performance. Such monitoring systems assist in controlling spray disposition rates and response times. Features include programmable application rates, pressure control, volume counters, and other measures of sprayer performance. However, these monitoring systems do not provide for mechanically automated safety shut-off of the disposition of spray in accordance with the travel of the sprayer, and the precision spray systems discussed above are not suited to controlling the spray system in accordance with the travel of the underlying machine.

SUMMARY OF THE INVENTION

The invention provides a control device and switch for controlling the valve of agricultural sprayers. The control device may be applied elsewhere by attachment for rotary feedback to a machine for translation of angular forces and communication of operating instruction in accordance with the rotary feedback.

With respect to agricultural sprayers, a hydraulic pump on a tractor pumps fluid from a holding tank to pressurize a fluid spray line. The fluid flows to a regulator valve with a bypass to return excess fluid to a holding tank. The pressurized fluid is held in check by a 12-volt valve, which is controlled by the switch. The switch is actuated to open the valve by the slow rotation of a wheel attached to the sprayer or by the rotation of the shaft on the planter when the planter begins to travel. When the tractor and spray unit move forward, the drive wheel or shaft will rotate the slip housing of the switch. The rotated housing within the switch will cause contact with a micro switch and close a circuit causing a switching coil to be energized. The coil will close it's contacts and send power to the valve located on the pressurized spray line. The valve will open allowing fluid to project from the spray nozzles on the sprayer's boom.

In one particular specific embodiment of the invention, the switch device may include a drive collar means for attachment of the device to an existing external shaft that imparts rotational angular velocity to the drive collar upon movement of the underlying machine. The drive collar translates the angular velocity of the external shaft to a large gear coupled to a smaller gear. The smaller gear translates the angular velocity to an impeller within the housing referred to above. Upon rotation of the impeller, grease within the housing apply frictional force to the housing. The housing is retained in a neutral position before the application of frictional force. However, the housing is sensitive to any rotational force and the friction of grease caused by rotation of the impeller within the housing will cause the housing to move out of its neutral position.

Upon movement out of its neutral position, the housing lifts a sensor arm 54 attached to a microswitch by moving cylindrical rotating tip 56 of the arm from its resting position in a notch 58 to a lift position caused by movement of the tip out of the recessed notch onto the relatively raised surface of the housing. Thereby, the microswitch is actuated and the valve opened in accordance with the movement of the sprayer.

DETAILED DESCRIPTION OF THE INVENTION

Figure 1:
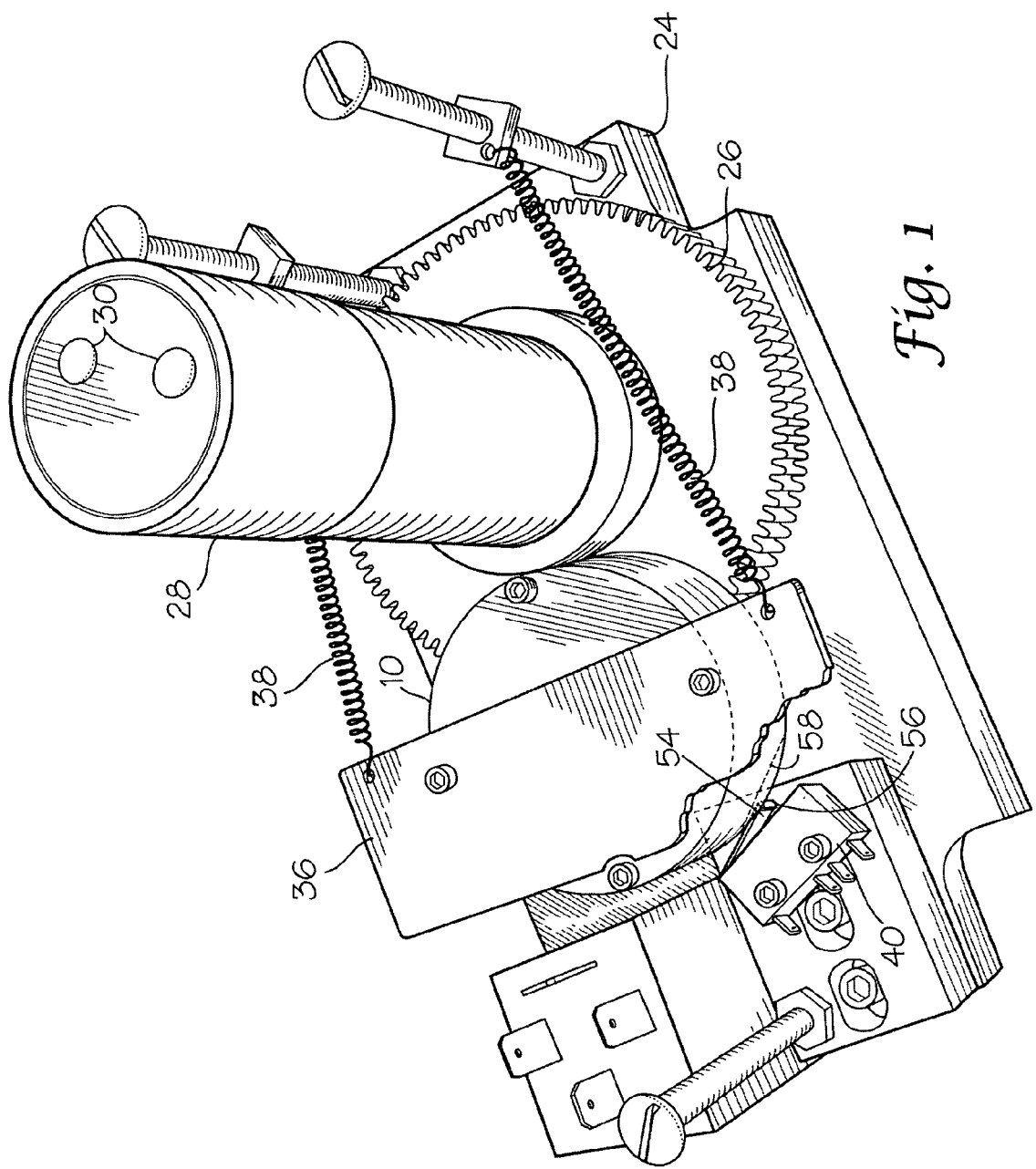
FIG. 1 is a end perspective view of a switch device constructed in accordance with the present invention.
Figure 2:
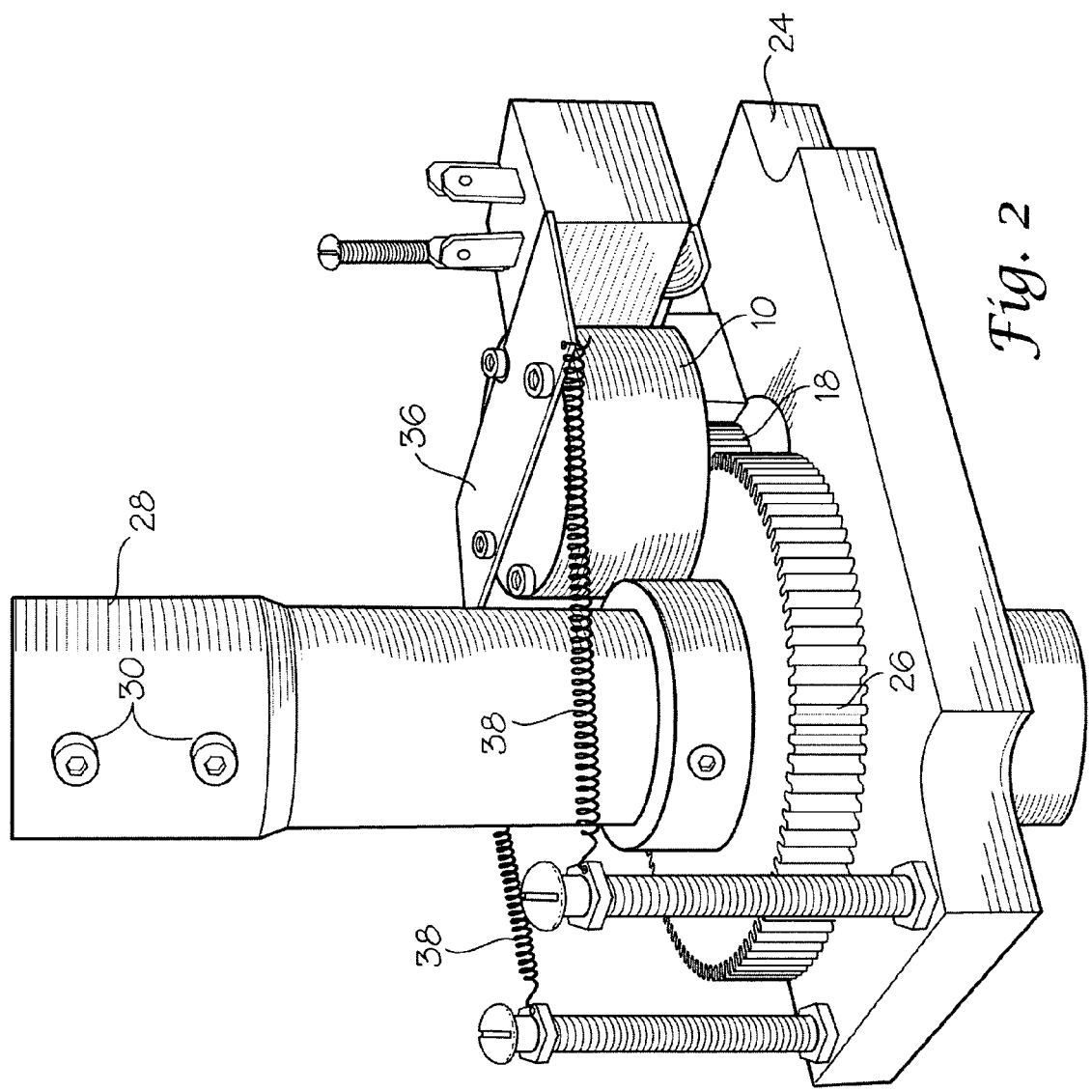
FIG. 2 is a side perspective view of the switch device.

FIG. 1 illustrates an embodiment of the limited slip switch of the present invention. The switch includes a rotary housing 10 in communication through a series of gears and drive collar 28 with a external shaft of a tractor or external rotary travel mechanism 42. The rotary housing 10 reacts to the rotary movement of the external shaft to translate the travel and external mechanical movement of the shaft to an electrical circuit for controlling the fluid valve on a sprayer.

A rotating member 12 such as an impeller is situated within the rotary housing 10 and connected to the external shaft. In this case, the impeller 12 is situated within the housing 10 by a bearing 14. The bearing stations the impeller within the housing such that the impeller rotates freely via the bearing without dragging on the housing wall. The remainder of the housing cavity is filled with a heavy fluid, semi-fluid or viscous material such as grease or lubricant. The rotating member 12, in this case the impeller, moves through or about the viscous material during rotation. The friction of the heavy fluid material causes movement of the housing 10 by applying angular force to a surface of the housing.

The location of the rotating member 12 in relation to the heavy fluid material and also the orientation of the fluid material in relation to the inside or outside of the housing 10 is variable in accordance with preferences in design. The drawings illustrate a preferred embodiment for practicing the invention, wherein, the impeller 12 is connected by a shaft 16 to a small gear 18 that is situated outside the housing 10. The shaft 16 is supported further by a second bearing 20 situated within a counter bore 22 of a base plate 24. The small gear 18 is operated upon by a larger gear 26 that is attached to a drive collar 28.

Figure 3:
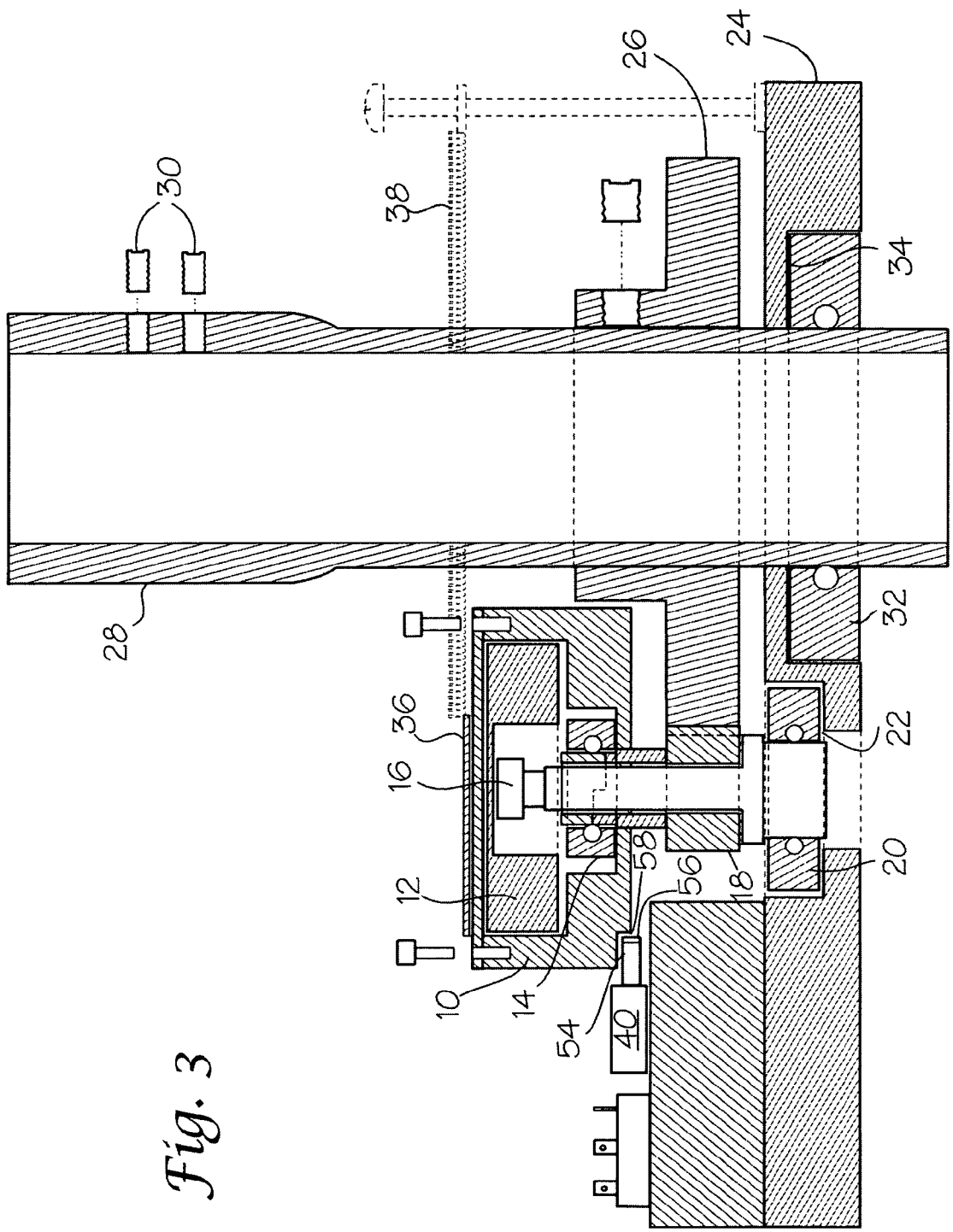
FIG. 3 is a cut-away side plan view of the switch device.

The drive collar 28 provides the means for attaching the limited slip switch to an existing external drive shaft or other shaft that will translate the external travel of the mechanism such as sprayer or tractor from a wheel or other rotary mechanism. The drive collar 28 may be attached to the external shaft by set screws 30 as shown in FIG. 3. Affixed to the external shaft, the drive collar 28 will rotate along with the external shaft upon rotary motion thereof translated from external travel of the underlying machine. The drive collar is rotationally supported by a collar bearing 32 that is situated within a recess 34 of the base plate 24. As the drive collar 28 rotates via the collar bearing when driven by the external shaft, the drive collar communicates this rotation directly to the large gear 26. The large gear in turn communicates the rotation to small gear 18 and as described above on to the impeller 12.

As the impeller 12 moves the grease within the housing 10, frictional force is applied by the grease movement to the surface of the housing. The frictional force causes the housing 10 to move in the direction of the rotational frictional force. Because the housing is situated on a bearing 14 that permits rotational movement of the housing, the slight frictional forced caused by a fluid or viscous material, such as grease, is sufficient to cause small movement of the housing.

The movement of the housing 10 is limited by a restrictive member 36 affixed to the housing's external surface. The restrictive member 36 biases the housing 10 to a neutral condition. As illustrated in FIG. 1., the neutral bias may be provided by attaching a pair of springs 38 to the outer extremities of the housing 10 via the restrictive member 36. The restrictive member may comprise tabs extending from the housing, a single toggle arm or a pair of arms restricted by pins and posts. Nevertheless, the restrictive means should limit the rotational movement of the housing by providing resistance to the housing moving greater than a desired degree. Meanwhile, the restrictive means should be neutral and should permit the housing to respond to even very slight travel of the underlying machine being monitored by the switch, such that any angular velocity of the external shaft attached to the switch device causes the switch to respond. Any complete cessation of angular velocity of the external shaft causes the switch to respond oppositely.

It is recognized that a variations of this preferred embodiment exist that are within the intended scope of the claimed invention. These variations may include a reversal of the primary configuration described in which the external drive shaft is attached directly to a housing of the switch and an impeller or other rotational member receives feedback from the rotation of the housing to provide for communication of a movement signal to a micro-switch.

Figure 4:
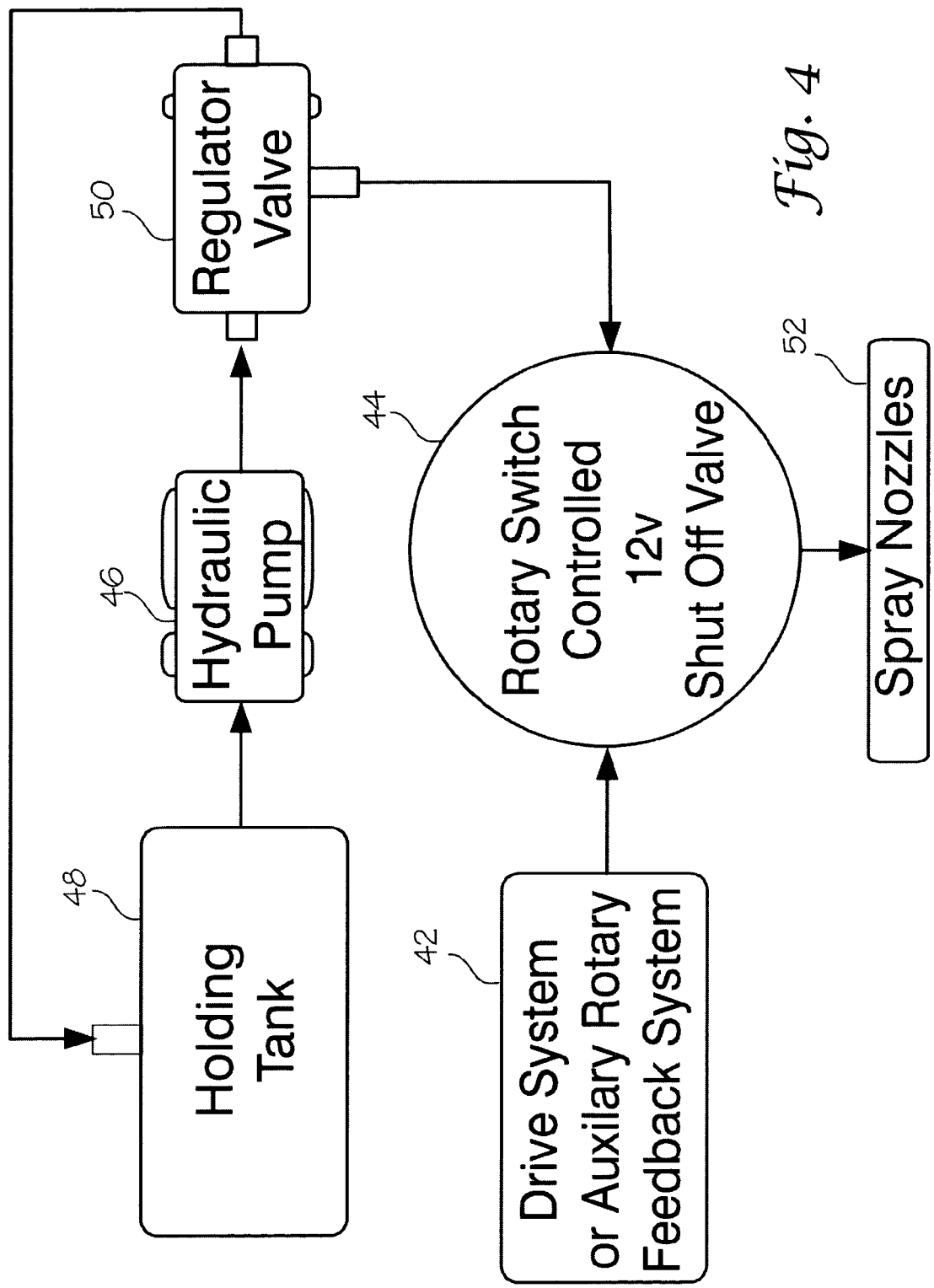
FIG. 4 is a schematic view of a basic agricultural sprayer system incorporating the switch device and depicting operation of the sprayer in accordance with the control method of the present invention.

FIG. 4 illustrates a means for integrating the switch device into use with an agricultural sprayer by using an auxiliary wheel assembly 42. An auxiliary wheel is attached to a sprayer by affixing a bracket to a portion of the sprayer such as a crossbar. An arm extends from the bracket to support the auxiliary wheel for contact with a ground surface when the sprayer is lowered for operation. The auxiliary wheels is attached to the arm by a shaft running through aligned holes in the arm and bearings aligned with the holes. As the auxiliary wheel contacts the ground, the wheel turns in accordance with the travel of the sprayer and the shaft supported by the bearings rotates. The shaft attached to the auxiliary wheel is attached at its opposing end to a switch device similar to that described above, except that the drive collar means and gears would be unnecessary. The shaft is attached directly to the impeller 12 within the housing 10 of the switch device. Upon movement of the sprayer, the impeller rotates causing frictional force on the housing, which moves from its neutral position, thus actuating a micro-switch 40. Electrical wiring extending from the micro-switch connects the switch device to the controls for the sprayer valve 44. Upon initiation of angular force on the switch device, the sprayer valve is opened and chemical may be allowed to be pumped by a hydraulic pump 46 from a holding tank 48, through a regulator valve 50, through the rotary switch controlled shut off valve 44, and through the spray nozzles 52. Upon cessation of angular force on the switch device, the sprayer valve 44 is closed and chemical ceases flowing through the spray nozzles 52.

The limited slip switch may be applied to agricultural sprayers, motor vehicles, industrial processes or other processes in which cessation of angular velocity of a rotating shaft in combination with the switch would be useful in generating a signal used in controlling operation of an external device. For example, the valves of a mobile irrigation system could be closed upon stoppage of movement by the systems wheels or pivot shaft.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention as defined by the claims.

We claim:

1. A control device for changing the state of a process upon initiation or cessation of angular forces from rotation of a machine driven shaft, comprising:
    a slip member arranged in a initial neutral position where the slip member rests while no angular forces are applied to the slip member;
    a rotational member situated in frictional communication with the slip member and being coupled directly or indirectly to the shaft and being rotatable in relation to the rotation of the shaft and upon rotation providing friction caused by angular force from the rotation of the rotational member, and the slip member being responsive to the friction;
    a biasing means retaining the slip member in the neutral position until the application of an angular force from the friction provided by rotation of the rotational member;
    a sensor on the slip member responsive to movement of the slip member out of or into the neutral position; and
    a switch operated by the sensor upon movement of the slip member out of or into the neutral position.

2. A control device for changing the state of a process upon initiation or cessation of angular forces according to claim 1, wherein said slip member comprises a cylindrical cover housing situated about said rotational member and containing a grease between the rotational member and an inner wall of the housing operated upon by the rotational member to provide the friction.

3. A control device for changing the state of a process upon initiation or cessation of angular forces according to claim 1, wherein said rotational member comprises an impeller.

4. A control device for changing the state of a process upon initiation or cessation of angular forces according to claim 3, wherein said impeller is coupled indirectly to the driven shaft by a combination of bearing a supported collar attached to said shaft, a first gear affixed to the collar, a second gear driven by the first gear, and the second gear being affixed to a second shaft that is supported by a bearing, and the second shaft being attached to said impeller.

5. A control device for changing the state of a process upon initiation or cessation of angular forces according to claim 1, wherein said rotational member is coupled indirectly to the driven shaft by a combination of bearing a supported collar attached to said shaft, a first gear affixed to the collar, a second gear driven by the first gear, and the second gear being affixed to a second shaft that is supported by a bearing, and the second shaft being attached to said rotational member.

6. A control device for changing the state of a process upon initiation or cessation of angular forces according to claim 1, wherein said biasing means comprises a pair of spring devices affixed to members extending from an exterior surface of said slip member.

7. A control device for changing the state of a process upon initiation or cessation of angular forces according to claim 1, wherein said sensor comprises an arm attached to said switch and extending therefrom such that an opposing end of the arm having a cylindrical roller attached thereto is positioned against said slip member in which the slip member includes a notch wherein the roller rests when the slip member is in the neutral position, and the roller lifts out of the notch when the slip member moves out of the neutral position.

8. A control device for changing the state of a process upon initiation or cessation of angular forces according to claim 1 in which the device includes an auxiliary wheel attached to the rotation member through at least one shaft member which rotates upon rotation of the machine driven shaft.

9. A method of changing the state of a process upon initiation of angular forces comprising the steps of:
    a. providing a rotation member and a slip member in frictional communication via a fluid or semifluid material;
    b. applying rotational force to the rotation member upon the initiation of rotation of a machine driven shaft causing the rotation member to rotate;
    c. engaging the fluid or semifluid material upon rotation of the rotation member to generate a frictional force by the fluid or semifluid material on the slip member;
    d. upon initiation of angular forces by the rotation by of the machine driven shaft, causing the slip member to move by application of the frictional force by the fluid or semifluid material;
    e. monitoring the movement of the slip member by a sensor initially in a first neutral condition;
    f. changing the condition of the sensor to a second condition upon movement of the slip member;
    g. providing a signal by the changing the condition of the sensor to the second condition; and h. changing the state of a process upon providing the signal.

10. A method of changing the state of a process upon initiation of angular forces as in claim 9 in which the slip member is including an additional steps of: returning the sensor to the first neutral condition upon cessation of the angular forces from the rotation by of the machine driven shaft; providing a second signal by the returning of the sensor to the first neutral condition; and changing the state of the process upon providing the second signal.

11. A method for controlling a sprayer comprising the steps of:
  a. providing an impeller and a housing in communication via a viscous agent;
  b. applying angular force to the impeller upon initiation of movement of a sprayer causing the impeller to rotate;
  c. engaging the viscous agent upon rotation of the impeller to generate an angular force on the housing;
  d. upon initiation of angular force by the movement of the sprayer, causing the housing to rotate by application of the angular force;
  e. monitoring the rotation of the housing by a sensor arm in an initial first neutral position;
  f. moving the sensor arm to a second position upon rotation of the housing;
  g. providing a signal by the changing the position of the sensor to the second position; and
  h. changing the state of a process upon providing the signal.

12. A system for controlling an agricultural sprayer as in claim 11 in which the angular force that is applied to the impeller upon the initiation of movement of a sprayer is provided by attaching an auxiliary wheel to the sprayer attached in rotary communication with the impeller.

\* \* \* \* \*